Figure 1:
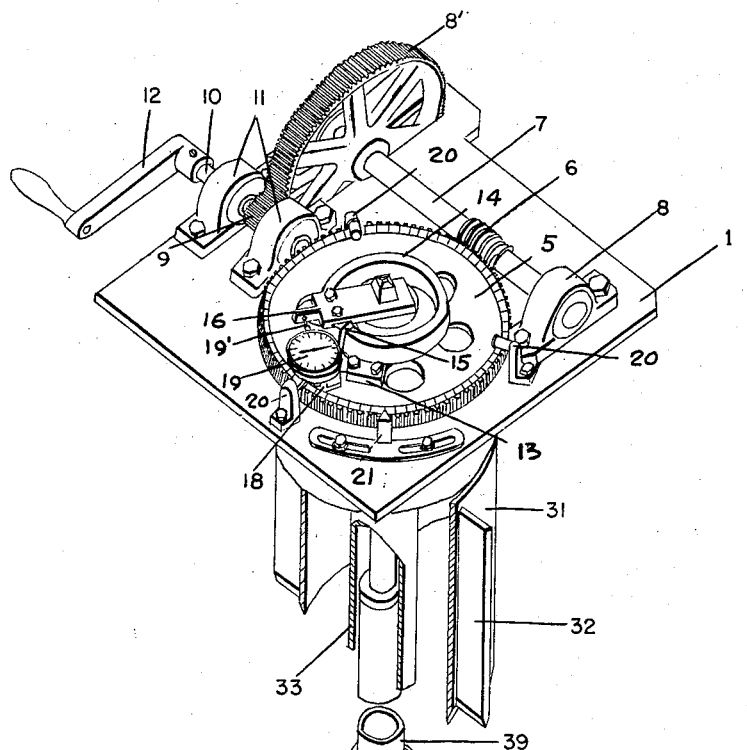

Oct. 6, 1959     H. J. GIBBS     2,907,204

IMPROVED VANE-TYPE SOIL TESTING APPARATUS

Filed July 23, 1956     2 Sheets-Sheet 1

HAROLD J. GIBBS
Inventor

Attorney

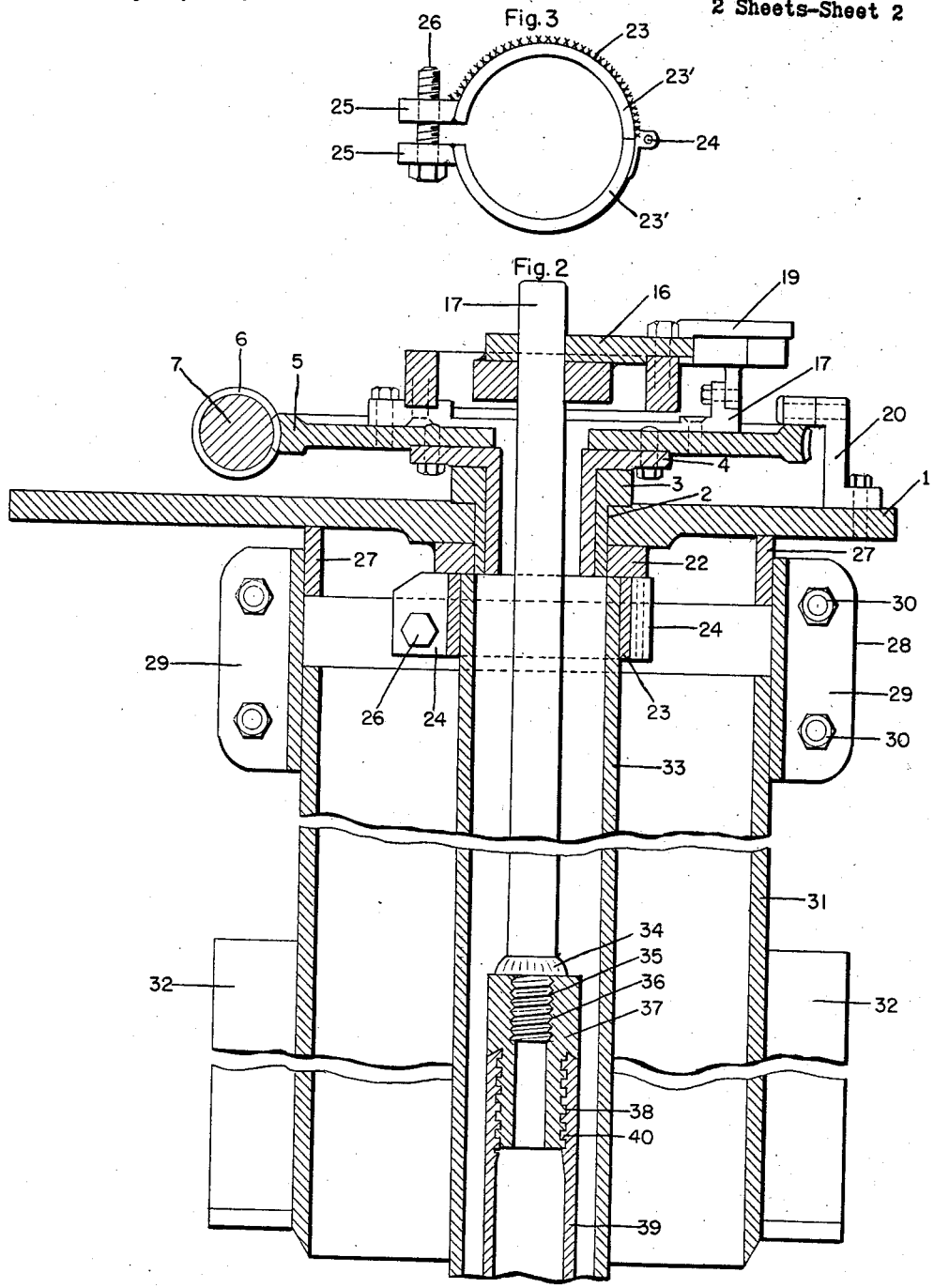

United States Patent Office 2,907,204
Patented Oct. 6, 1959

2,907,204

IMPROVED VANE-TYPE SOIL TESTING APPARATUS

Harold J. Gibbs, Denver, Colo., assignor to the United States of America as represented by the Secretary of the Interior Application July 23, 1956, Serial No. 599,668

8 Claims. (Cl. 73—101)

(Granted under Title 35, U.S. Code (1952), sec. 266)

This invention herein described and claimed, may be manufactured and used by or for the Government of the United States of America, or for governmental purposes without the payment of any royalty thereon.

This invention is concerned with a device for determining the inplace shearing resistance of soils.

Knowledge of the shearing resistance of soils is necessary in foundation investigations for dam construction, and other engineering structures. Where soft, water saturated clays are involved, the usual sampling and laboratory methods do not give satisfactory test results. An in-place method of measuring shear resistance would be desirable, since the use of such methods as penetration resistance and unconfined compression produced results which are irregular and difficult to interpret with confidence.

The principal object of the invention is to provide an improved vane testing apparatus which is compact and portable, and which will accurately measure the shearing resistance of the soil in place.

Another object of the invention is to provide an improved vane testing apparatus which contains a torque measuring apparatus and a torque applicator which applies a balance moment couple.

Another object of the invention is to provide an improved vane testing apparatus in which the torque applicator and the torque measuring device are on the same unit and do not involve moving parts, but depend on elastic strain for the measurement.

Another object of the invention is to provide an improved, gear driven, controlled-speed vane testing apparatus, wherein the torque measurements are substantially unaffected by wear, friction or dirtiness of the gears.

Another object of the invention is to provide an improved vane testing apparatus which employs standard drill rods and casings, so that it may be used to test soils at any desired depth below the surface.

Another object of the invention is to provide an improved vane testing apparatus supported on a large diameter casing pipe having side fins which are adapted for use under all variety of surface soil conditions, such as firm, standing water, muddy, etc.

The invention consists of a gear assembly which applies a balanced torque, through a torque applicator, to a vane stem having a four-bladed vane at its lower end at the desired depth in the soil. The torque applicator may be, for example, a heavy duty spring steel ring, with a cut-out section, having a rigid arm extending radially inward from the circumference of the ring. A square hole in the arm, located at the center of the ring, fits the square top portion of the vane rod.

The torque ring is mounted rigidly on a horizontal worm wheel which has a large center aperture through which the square vane rod feely passes. Torque is transmitted by the gear system through the ring to the rigid arm and thence to the vane rod. As torque is applied, the cut portion of the ring tends to close so that an extension of the rigid arm presses against a strain gage, which is calibrated for foot-pounds of torque.

Other forms of vane testing apparatus are known. In one, the torque is applied by a hand torque-wrench type of device which is difficult to operate at the accurately controlled speeds necessary for correct readings of the torque throughout the progress of the test. Other instruments have a wheel pulley arrangement in which tension is applied by a hand winch to cable coming from the wheel pulley, and is measured by a spring balance. This results in a side thrust, necessitating a top thrust bearing and causing a variable friction error which becomes greater as the torque increases.

The advantages of this invention are that:

(1) It is capable of operating at controlled speeds of rotation and permits periodic readings for a complete curve of test results.

(2) Errors in the readings due to variable bearing friction are eliminated.

(3) The device is sturdy and simple in its operation, and is adapted to a variety of surface conditions.

(4) The device is adapted for use with standard drilling equipment.

Other advantages will be apparent from the detailed description of the device given below.

Figure 4:
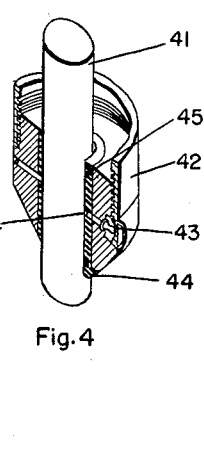

Reference will be had to the accompanying drawings in which Fig. 1 is an isometric view of the apparatus embodying this invention. Fig. 2 is a vertical sectional view of the upper portion of the device taken through its center, omitting certain non-essential elements. Fig. 3 is a detailed plan view of the clamping ring. Fig. 4 is an enlarged view, partly in section, of the lower bearing.

Referring more particularly to the drawing, Fig. 2, 1 indicates a mounting plate having a circular aperture 2, a sleeve bearing 3 inserted therein and a bushing 4 rotatably mounted in the bearing. Fastened to the shoulder portion of the bushing is worm-wheel 5 driven by worm 6. As shown in Fig. 1, worm 6 is mounted on shaft 7, which is mounted on plate 1 by two pillow blocks and bearings 8, only one of which is visible in the figure. The shaft 7 has a spur gear 8' mounted thereon, which is driven by pinion 9 mounted on shaft 11. The latter is rotatably supported on plate 1 by pillow blocks and bearings 11, and has fastened at one end crank 12. Mounted on worm wheel 5 by means of bracket 13 is torque ring 14, made of spring steel or other suitable resilient material, which has a cut-out portion 15, and a rigid radial arm 16 fastened adjacent one end of the cut-out portion. The inner end of arm 16 has a square opening which receives square rod 17 passing freely through the opening in bushing 4 and the open portion of torque ring 14. A strain gage 19 is mounted on bracket 18 attached to worm wheel 5. Stem 19' contacts radial arm 16 adjacent the junction of the radial arm and the torque ring. Serving to restrain worm wheel 5 are thrust rollers 20, which are bolted to plate 1. Worm wheel 5 is marked in degrees at its outer rim, and pointer 21 adjustably fastened to platen 1 serves to register the amount of rotation.

Spacer ring 22 is fixed to the underside of plate 1 concentrically with hole 2. This ring in turn carries hinged clamping ring 23, adapted to receive standard drill casing, consisting of two portions 23', fastened together at one end by hinge 24, and having lugs 25 adapted to receive bolt 26 at the other. By turning bolt 26, the clamp may thus be opened or closed.

A short section of larger diameter casing 27 (Fig. 2) is fastened to the underside of plate 1 concentrically with hole 2. Clamp 28, consisting of two short semi-cylindrical sections which fit over member 27, each section having a lug 29 at each end and bolts 30 joining the lugs together, serves to detachably fasten plate 1 to supporting casing 31. Element 31, which has the same diameter as member 27, has fastened to its lower portion stabilizing fins 32.

Detachably fastened to plate 1 by means of clamping ring 23 is standard drill casing 33. The lower end of square rod 17 terminates in built up shoulder 34 and male threaded portion 35. Flush coupling 36 having upper female threaded portion 37 and lower male threaded portion 38 is mounted on rod 17. Standard drill rod 39 having female threaded portion 40 at its upper end is attached to coupling 36. By using standard couplings and drill rods, the length of the drilling string may be extended as desired.

Attached to the bottom end of the drill rod string by means of a coupling not shown, similar to element 36, is vane rod 41, having at its lower end a cross-shaped test vane 41' detachably fastened by known means thereto. The drill rod is housed in the drill casing, which likewise may be extended in the well known manner. At the lower end of the drill casing and fastened to it, is bearing 42 (Fig. 4), having standard pressure lubricating fittings 43, grease chamber 44 and ring seals 45. The bearing receives vane rod 40, so that the vane rod is free to rotate and have vertical movement.

The operation of the device is as follows:

The anchor casing 31 is placed on the ground surface and the stabilizing fins 32 are embedded 1 foot deep into the soil to serve as a firm support for the instrument. The length of the casing may be varied, depending on the surface conditions, e.g., dry land or standing water. If the ground surface is dry, the casing need be only 2 feet long to permit operation of the equipment.

A small hole is augered into the ground at the center of the casing to start the placement of the vane stem.

Parenthetically, the latter is the term used to designate the assembly of vane rod and drill rods. Sections of drill casing and drill rod are assembled and attached to the vane rod, and passed through a centering template mounting on the casing, and the vane stem and casing are then pressed into the ground. Additional drill rod and casing are coupled in the usual way and forced into the ground until the vane 41', which is in the up position against the lower bearing 42 is about 30 inches above the desired depth for testing. The top of the drill casing should project a short distance above the outer casing, and the drill rod should extend a short distance above the drill casing in order to provide wrench gripping space.

The upper square section 17 is next attached to rod 40, and the vane stem is then forced downwardly 30 inches to place the vane in undisturbed soil.

The torque assembly, comprising plate 1, crank 12, shaft 10, spur gear and pinion 8 and 9, worm 6, worm wheel 5, strain gage 19 and torque ring 14, is then clamped to the drill casing by means of hinged clamp 23, first passing square rod 17 through the corresponding hole in 16. Then outer casing 31 is fastened to mounting ring 27 by means of clamp 28.

The recommended rate of revolution of the vane stem is .1 degree of rotation of the stem per second. The number of revolutions of the crank handle per second to give this result will vary with the gear ratios employed. Once determined, the operator can readily pace himself with a stop watch. Strain gage readings are taken at intervals of every 5 degrees of rotation, or oftener, if desired, and the results plotted as gage readings against rotation. A sharp discontinuity in the plotted curve is the point at which shear failure takes place. Since the instrument previously was calibrated, the gage reading at this point of failure is readily converted to foot-pounds.

Operation of the device is continued after failure to be certain of failure and to determine the strength of remolded soil conditions. The amount of torque necessary to overcome the friction due to the lower water-tight bearing, and the exposed thirty inches of vane rod in the soil is determined by a separate test using the vane rod without the vanes attached or a blank stem. This has been found to be nearly constant, and is relatively small for any particular soil deposit. One set of friction observation at varying depth is considered adequate for several vane tests.

Subtracting the friction reading from the reading at soil failure, gives the corrected strain gage reading for failure.

The vane sizes may be varied, depending on the strength of the soil being tested. Three vanes have been used, having diameters of 2, 3 and 4 inches and respective lengths of 4, 6 and 8 inches. The length is twice the diameter for convenience in calculations.

By use of the equation $$s = \frac{3T}{28\pi r^3}$$

where $s$ is the shearing resistance of the soil, $T$=torque at failure, $r$=radius of the cylindrical plug sheared by the vanes, the shearing resistance is readily obtained.

It will be appreciated from the foregoing specification, that the invention, herein described and shown, is susceptible of various changes and modifications without departing from the spirit and scope thereof. Many modifications will occur to those skilled in the art within the scope of the following claims.

What I claim as my invention is:

1. A device for measuring the shear strength of soils which comprises a tubular outer casing, radially extending stabilizing fins rigidly connected to said tubular casing, a platen detachably connected to the upper end of said tubular casing and normal to the longitudinal axis thereof, a tubular inner casing demountably connected at its upper end to said platen, a shaft having a vane at its lower end for insertion into the ground, said shaft being located at the longitudinal axis of the inner and outer tubular casings, the upper end of said shaft extending above the ground surface and passing through an opening in said platen, a circular driven member of relatively large diameter, centered on the axis of said shaft, a resilient member capable of slight but measurable movements when under torque, said driven member being connected to the upper portion of said shaft by the resilient member means for measuring said movement, a relatively smaller driving member coacting with said larger driven member, and means for actuating said driving member whereby torque may be applied to the shaft by means of the resilient member.

2. A device for measuring the shear strength of soils which comprises a tubular outer casing, radially extending stabilizing fins rigidly connected to said tubular casing, a platen detachably connected to the upper end of said tubular casing and normal to the longitudinal axis thereof, a tubular inner casing demountably connected at its upper end to said platen and having bearing means at its lower end, a shaft having a vane at its lower end for insertion into the ground, said shaft being located at the longitudinal axis of the inner and outer tubular casings, the upper end of said shaft extending above the ground surface and passing through an opening in said platen, said shaft being journalled in said inner casing bearing means, a circular gear member of relatively large diameter centered on the axis of said shaft, a torque ring, said gear member being rigidly fastened to the torque ring at one portion thereof, said shaft being connected at another portion of said torque ring by an inner radial arm having an opening axial with the shaft so as to transmit rotary motion thereto but permit vertical translational motion, said torque ring being capable of slight but measurable movement when under torque, means for measuring said movement, a relatively smaller gear meshing with said larger gear member, and means for rotating said smaller gear member, whereby torque is applied to said shaft by means of the torque ring.

3. A device for measuring the shear strength of soil which comprises, a shaft having vane means at one end for insertion into the ground, the other end of the shaft extending above the ground surface when in use, a first gear member of relatively large diameter, said gear member having a relatively large axial opening, said shaft having a relatively smaller diameter than said axial opening, said shaft passing through the axial opening along the transverse axis of the first gear member, whereby said shaft is spaced from the perimeter of said axial opening, a resilient torque ring capable of slight but measurable movement when under torque, means connecting said torque ring to the first gear member and shaft for transmitting torque from said gear to the shaft, said connecting means permitting vertical translational motion of the shaft relative to the torque ring, a second gear member of relatively smaller diameter co-acting with said first gear member, and means for rotating said second gear member.

4. A device for measuring the shear strength of soils which comprises a tubular outer casing, radially extending stabilizing fins rigidly connected to said tubular casing, a platen detachably connected to the upper end of said tubular casing and normal to the longitudinal axis thereof, a tubular inner casing demountably connected at its upper end to said platen, a shaft having a vane at its lower end for insertion into the ground, said shaft being located at the longitudinal axis of the inner and outer tubular casings, the upper end of said shaft extending above the ground surface and passing through an opening in said platen, a resilient member capable of slight but measurable movements when under torque, a circular driven member connected to the upper end of said shaft by the resilient member means for measuring said movement, and actuating means for applying torque to the driven member.

5. A device as set forth in claim 4 in which said circular driven member is a gear member of relatively large diameter and said driven member is caused to rotate by a relatively smaller gear member, whereby the torque may be applied to said resilient member.

6. A device as in claim 5, wherein said resilient means is a torque ring, and said shaft passes through a bearing member at the lower end of said inner casing.

7. A device for measuring the shear strength of soil which comprises, a shaft having vane means at one end for insertion into the ground, the other end of said shaft extending above the ground surface when in use, a driven member of relatively large diameter, said driven member having a relatively large axial opening, said shaft having a relatively smaller diameter than the axial opening, said shaft passing through the axial opening along the transverse axis of the driven member, whereby said shaft is spaced from the perimeter of the axial opening, resilient means capable of slight but measureable movement when under torque, means connecting said resilient means to the driven member and shaft for transmitting torque from said driven member to the shaft, said connecting means permitting vertical translational motion of the shaft relative to the resilient means, a driving member of relatively smaller diameter co-acting with said driven member and means for rotating the driving member.

8. A device for measuring the shear strength of soil which comprises, a shaft having vane means at one end for insertion into the ground, the other end of the shaft extending above the ground surface when in use, a first gear member of relatively large diameter, said first gear member having a relatively large axial opening, said shaft having a relatively smaller diameter than the said axial opening, said shaft passing through the axial opening along the transverse axis of said first gear member and passing through the said axial opening, whereby the shaft is spaced from the perimeter of the axial opening, a resilient member rigidly fastened at one portion thereof to said first gear member and connected at another portion to said shaft so as to transmit rotary motion thereto, but permit vertical translational motion, said resilient member capable of slight but measurable movement when under torque, means for measuring said movement, a relatively smaller gear member meshing with said larger gear member, and means for rotating said smaller gear member, whereby torque is applied to said shaft by means of the resilient member.

References Cited in the file of this patent

UNITED STATES PATENTS

| | | |
|---|---|---|
| 1,106,865 | Dorr | Aug. 11, 1914 |
| 2,151,953 | Zimmerman | Mar. 28, 1939 |
| 2,491,251 | Chinn | Dec. 13, 1949 |
| 2,603,967 | Carlson | July 22, 1952 |
| 2,709,363 | Lea | May 31, 1955 |

FOREIGN PATENTS

| | | |
|---|---|---|
| 134,834 | Sweden | Mar. 11, 1952 |